United States Patent
Kang et al.

(10) Patent No.: US 12,385,667 B2
(45) Date of Patent: Aug. 12, 2025

(54) AIR FILTER WITH DEPLOYMENT MECHANISM AND CONTROL FOR HVAC APPLICATIONS

(71) Applicant: Carrier Corporation, Palm Beach Gardens, FL (US)

(72) Inventors: Keunmo Kang, San Diego, CA (US); Marcin Cychowski, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 867 days.

(21) Appl. No.: 17/057,277

(22) PCT Filed: Aug. 13, 2019

(86) PCT No.: PCT/US2019/046297
§ 371 (c)(1),
(2) Date: Nov. 20, 2020

(87) PCT Pub. No.: WO2020/041036
PCT Pub. Date: Feb. 27, 2020

(65) Prior Publication Data
US 2021/0207825 A1   Jul. 8, 2021

Related U.S. Application Data

(60) Provisional application No. 62/720,627, filed on Aug. 21, 2018.

(51) Int. Cl.
*F24F 13/28* (2006.01)
*B01D 46/42* (2006.01)
(Continued)

(52) U.S. Cl.
CPC .......... *F24F 13/28* (2013.01); *B01D 46/4227* (2013.01); *B01D 46/442* (2013.01);
(Continued)

(58) Field of Classification Search
None
See application file for complete search history.

(56) References Cited

U.S. PATENT DOCUMENTS

| 5,707,005 A | 1/1998 | Kettler et al. |
| 6,790,136 B2 | 9/2004 | Sharp et al. |

(Continued)

FOREIGN PATENT DOCUMENTS

| CN | 107228473 A | 10/2017 | |
| JP | H1085533 A * | 4/1998 | ............. B01D 46/00 |

(Continued)

OTHER PUBLICATIONS

Espacenet Translation of KR 101842800B1 (Year: 2018).*
(Continued)

*Primary Examiner* — Brit E. Anbacht
(74) *Attorney, Agent, or Firm* — CANTOR COLBURN LLP (57) ABSTRACT

A heating, ventilation, and air conditioning (HVAC) system includes an air handling unit, a supply airflow damper to direct a supply airflow from the air handling unit to a conditioned space, and one or more filters selectively deployable across a flowpath of the air handling unit to remove one or more contaminants from the supply airflow prior to the supply airflow passing through the supply airflow damper. A control system is operably connected to the one or more filters to direct movement of the one or more filters between a deployed position and a stowed position.

11 Claims, 5 Drawing Sheets

(51) Int. Cl.
  *B01D 46/44* (2006.01)
  *B01D 46/46* (2006.01)
  *B01D 53/30* (2006.01)
  *F24F 8/10* (2021.01)
  *F24F 110/64* (2018.01)
  *F24F 110/66* (2018.01)
  *F24F 110/70* (2018.01)

(52) U.S. Cl.
  CPC .............. *B01D 46/46* (2013.01); *B01D 53/30* (2013.01); *F24F 8/10* (2021.01); *B01D 2279/50* (2013.01); *F24F 2110/64* (2018.01); *F24F 2110/66* (2018.01); *F24F 2110/70* (2018.01)

(56) References Cited

U.S. PATENT DOCUMENTS

| | | | |
|---|---|---|---|
| 9,101,866 B2 | 8/2015 | Miller | |
| 9,149,753 B2 | 10/2015 | Wang | |
| 9,254,459 B2 | 2/2016 | Miller | |
| 9,441,598 B2 | 9/2016 | Futa et al. | |
| 9,657,694 B2 | 5/2017 | Santini et al. | |
| 9,702,802 B2 | 7/2017 | Ajay et al. | |
| 9,714,779 B2 | 7/2017 | Cur et al. | |
| 11,885,510 B2* | 1/2024 | Douglas | F24F 8/108 |
| 2004/0253918 A1* | 12/2004 | Ezell | F24F 11/63 454/239 |
| 2006/0130502 A1* | 6/2006 | Wruck | F24F 7/08 62/186 |
| 2007/0205297 A1* | 9/2007 | Finkam | F24F 11/30 236/1 C |
| 2008/0184894 A1 | 8/2008 | Grundelman | |
| 2010/0307733 A1* | 12/2010 | Karamanos | F24F 11/84 165/254 |
| 2014/0251129 A1 | 9/2014 | Upadhyay et al. | |
| 2014/0260692 A1* | 9/2014 | Sharp | F24F 11/74 73/863.23 |
| 2015/0176909 A1* | 6/2015 | Josserand | F24F 7/10 165/121 |
| 2017/0363306 A1 | 12/2017 | Cur et al. | |
| 2020/0188832 A1* | 6/2020 | Woods | B01D 46/58 |
| 2022/0203288 A1* | 6/2022 | Wenger | B01D 46/0036 |
| 2022/0282886 A1* | 9/2022 | Hriljac | F24F 7/06 |

FOREIGN PATENT DOCUMENTS

| | | | |
|---|---|---|---|
| KR | 101842800 B1 * | 3/2018 | ......... B01D 46/4227 |
| WO | 2017109206 A1 | 6/2017 | |

OTHER PUBLICATIONS

Espacenet Translation of JP H1085533A (Year: 1998).*
International Preliminary Report on Patentability; International Applicatiion No. PCT/US2019/046297; International Filing Date Aug. 13, 2019; Date of Mailing Mar. 4, 2021; 7 pages.
International Search Report for International Application No. PCT/US2019/046297, International Filing Date: Aug. 13, 2019, Date of Mailing: Nov. 7, 2019, 6 pages.
Written Opinion for International Application No. PCT/US2019/046297, International Filing Date: Aug. 13, 2019, Date of Mailing: Nov. 7, 2019, 8 pages.

* cited by examiner

AIR FILTER WITH DEPLOYMENT MECHANISM AND CONTROL FOR HVAC APPLICATIONS

CROSS REFERENCE TO RELATED APPLICATIONS

This application is a National Stage application of PCT/US2019/046297, filed Aug. 13, 2019, which claims the benefit of Provisional Application No. 62/720,627 filed Aug. 21, 2018, the disclosures of which are incorporated herein by reference in their entirety.

BACKGROUND

Exemplary embodiments pertain to the art of heating, ventilation and air conditioning (HVAC) systems. In particular, the present disclosure relates to assessment and control of indoor air quality (IAQ) in a conditioned space.

Maintaining indoor air quality (IAQ) in spaces served by HVAC systems is a major concern, with maximum levels of contaminants such as particulates, $CO_2$, and volatile organic compounds (VOCs). Such contaminant levels are typically managed by filters located across a flowpath of the HVAC system to remove the contaminants from the airflow. The filters, which may include particulate filters, VOC filters and $CO_2$ scrubbers, fixed in an air handling unit of the HVAC system.

BRIEF DESCRIPTION

In one embodiment, a heating, ventilation, and air conditioning (HVAC) system includes an air handling unit, a supply airflow damper to direct a supply airflow from the air handling unit to a conditioned space, and one or more filters selectively deployable across a flowpath of the air handling unit to remove one or more contaminants from the supply airflow prior to the supply airflow passing through the supply airflow damper. A control system is operably connected to the one or more filters to direct movement of the one or more filters between a deployed position and a stowed position.

Additionally or alternatively, in this or other embodiments the one or more filters include a particulate filter, a volatile organic compound filter, or a $CO_2$ scrubber.

Additionally or alternatively, in this or other embodiments a plurality of sensors are located at the air handling unit and operably connected to the control system, the control system directing movement of the one or more filters based on conditions sensed by the plurality of sensors.

Additionally or alternatively, in this or other embodiments a return airflow damper directs a return airflow from the conditioned space into the air handling unit, wherein the plurality of sensors includes a plurality of return airflow sensors located at the return airflow damper.

Additionally or alternatively, in this or other embodiments the plurality of return airflow sensors include one or more of a return particulate matter sensor, a return volatile organic compound sensor, and a return $CO_2$ sensor.

Additionally or alternatively, in this or other embodiments the control system signals for deployment of one or more filters when a condition sensed by a return airflow sensor of the plurality of return airflow sensors exceeds a selected threshold.

Additionally or alternatively, in this or other embodiments the return airflow damper is moved between an opened position and a closed position in response to a return airflow condition detected by the plurality of return airflow sensors.

Additionally or alternatively, in this or other embodiments an outdoor airflow damper is located at the air handling unit configured to selectably admit an outside airflow into the air handling unit, wherein the plurality of sensors includes a plurality of outside airflow sensors located at the outdoor airflow damper.

Additionally or alternatively, in this or other embodiments the plurality of outdoor airflow sensors includes an outdoor airflow particulate matter sensor.

Additionally or alternatively, in this or other embodiments the control system signals for deployment of one or more filters when a condition sensed by an outside airflow sensor of the plurality of outside airflow sensors exceeds a selected threshold.

Additionally or alternatively, in this or other embodiments the outdoor airflow damper is moved between a minimum opened position and a maximum opened position in response to an outdoor airflow condition detected by the plurality of outside airflow sensors.

Additionally or alternatively, in this or other embodiments the one or more filters are configured to rotate about a pivot to move between a deployed position and a stowed position.

Additionally or alternatively, in this or other embodiments one or more of a heating coil and a cooling cool is located in the air handling unit to condition the supply airflow.

Additionally or alternatively, in this or other embodiments one or more fans are located in the air handling unit to direct airflow through the air handling unit.

In another embodiment, a method of operating a heating, ventilation and air conditioning (HVAC) system includes sensing one or more contaminant levels in an airflow of the HVAC system via one or more sensors located at the HVAC system, comparing the one or more contaminant levels to one or more threshold values, and selectively deploying one or more filters across an airflow of the HVAC system if the one or more contaminant levels exceed the one or more threshold values.

Additionally or alternatively, in this or other embodiments the one or more sensors includes one or more of a particulate matter sensor, a volatile organic compound sensor and a $CO_2$ sensor.

Additionally or alternatively, in this or other embodiments the one or more filters are one of more of a particulate matter filter, a volatile organic compound filter and a $CO_2$ scrubber.

Additionally or alternatively, in this or other embodiments selectably deploying the one or more filters comprises rotating the one or more filters about a filter pivot between a deployed position and a stowed position.

Additionally or alternatively, in this or other embodiments selectably opening and or closing one or more dampers of the HVAC system is based on a result of the comparison.

Additionally or alternatively, in this or other embodiments the one or more dampers include one or more of a return air damper, an outside air damper and an exhaust air damper.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the figures.

The use of filters in an HVAC system increases air flow resistance. The increased air flow resistance correspondingly increases energy consumption by, for example, fans urging the airflow through the HVAC system to overcome the increased air flow resistance and provide the required airflow to condition the space to a set point temperature.

Figure 1:
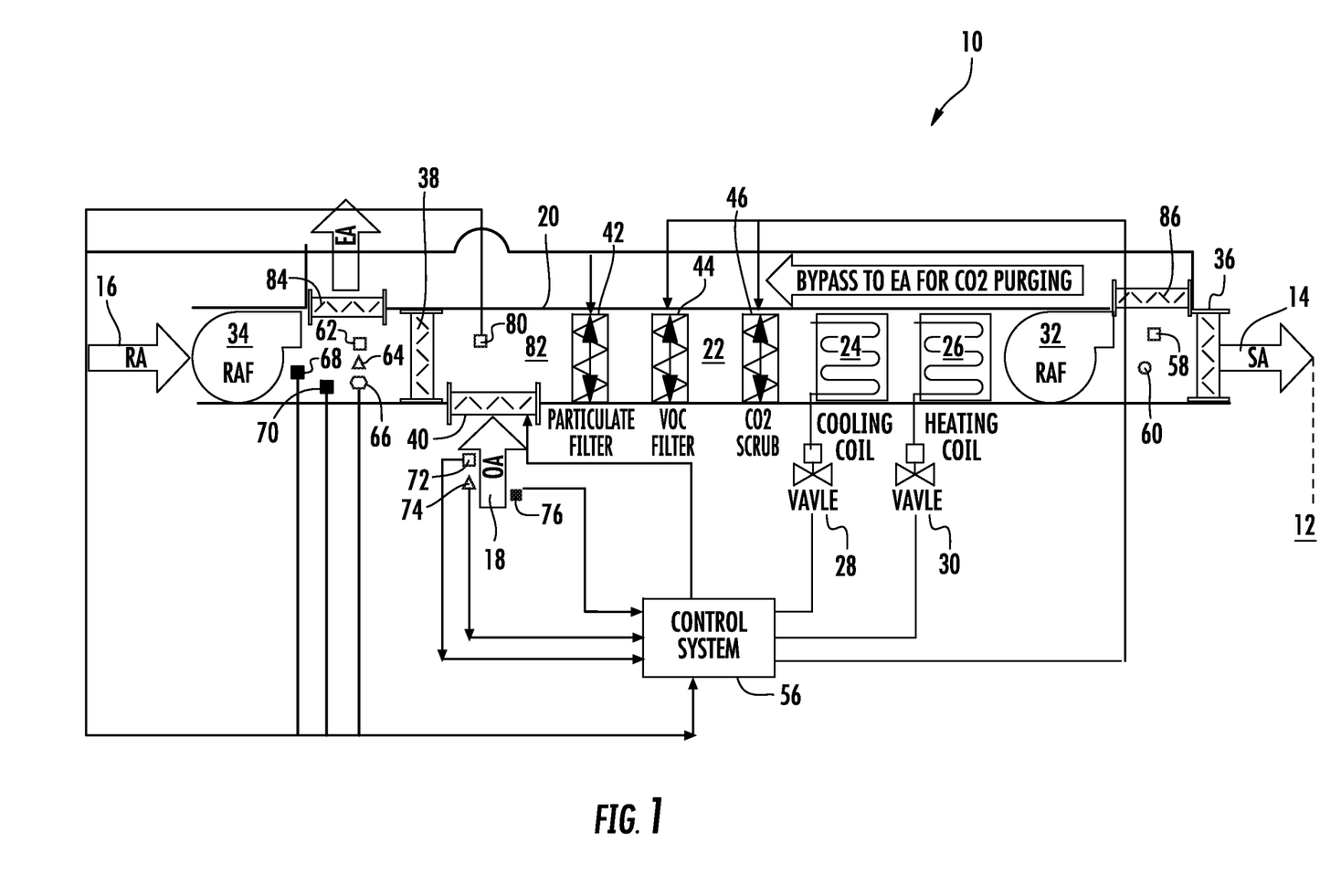
FIG. 1 is a schematic illustration of an embodiment of a heating, ventilation, and air conditioning system.

FIG. 1 is a schematic illustration of an embodiment of a heating, ventilation, and air conditioning (HVAC) system 10. The HVAC system 10 is provided to circulate a supply airflow 12 into a conditioned space 14 to maintain the conditioned space 14 at a selected set point temperature. The HVAC system 10 utilizes one or more of a return airflow 16 returned to the HVAC system 10 from the conditioned space 14 and an outside airflow 18 introduced into the HVAC system 10 from outside of the conditioned space 14. Outside airflow 18 is also referred to as fresh airflow.

The HVAC system 10 includes an air handler 20, which generally defines an air flowpath 22 through the air handler 20. A cooling coil 24 and a heating coil 26 are disposed in the air handler 20, extending across the air flowpath 22. The cooling coil 24 is connected to a cooling valve 28, which when opened circulates a cooling flow, for example, a refrigerant or chilled water, through the cooling coil 24. Similarly, the heating coil 26 is connected to a heating valve 30 which when opened circulates a heating fluid, such as a heated liquid or air, through the heating coil 26. In operation, the heating valve 30 or the cooling valve 28 is opened to heat or cool the airflow flowing through the air handler 20, depending on whether heating or cooling of the supply airflow 12 is needed to achieve the set point temperature at the conditioned space 14.

To urge flow through the air handler 20, a supply airflow fan 32 and a return airflow fan 34 are located in the air handler 20. In some embodiments, the supply airflow fan 32 is located near a supply air damper 36, through which the supply airflow 12 exits the air handler 20 toward the conditioned space 14. In some embodiments, the supply airflow fan 32 is located downstream of the cooling coil 24 and the heating coil 26. The return airflow fan 34 is located at an opposite end of the air handler 20 from the supply airflow fan 32, and in some embodiments is located at a return air damper 38 through which the return airflow 16 is directed from the conditioned space 14 into the air handler 20. The air handler 20 further includes an outside airflow damper 40 through which the outside airflow 18 is admitted into the air handler 20. In some embodiments, the supply airflow damper 36, the return airflow damper 38 and the outside airflow damper 40 are variable, such that the airflow through the dampers 36, 38, 40 may be regulated by opening or closing the dampers 36, 38, 40.

The air handler 20 further includes one or more filters to remove contaminants from the airflow in the air handler 20. The filters are located, for example between the outside airflow damper 40 and the cooling coil 24 and the heating coil 26, such that contaminants are removed from the airflow prior to heating or cooling the airflow. The filters may include a particulate filter 42, a VOC filter 44, and a $CO_2$ scrubber 46.

Figure 2:
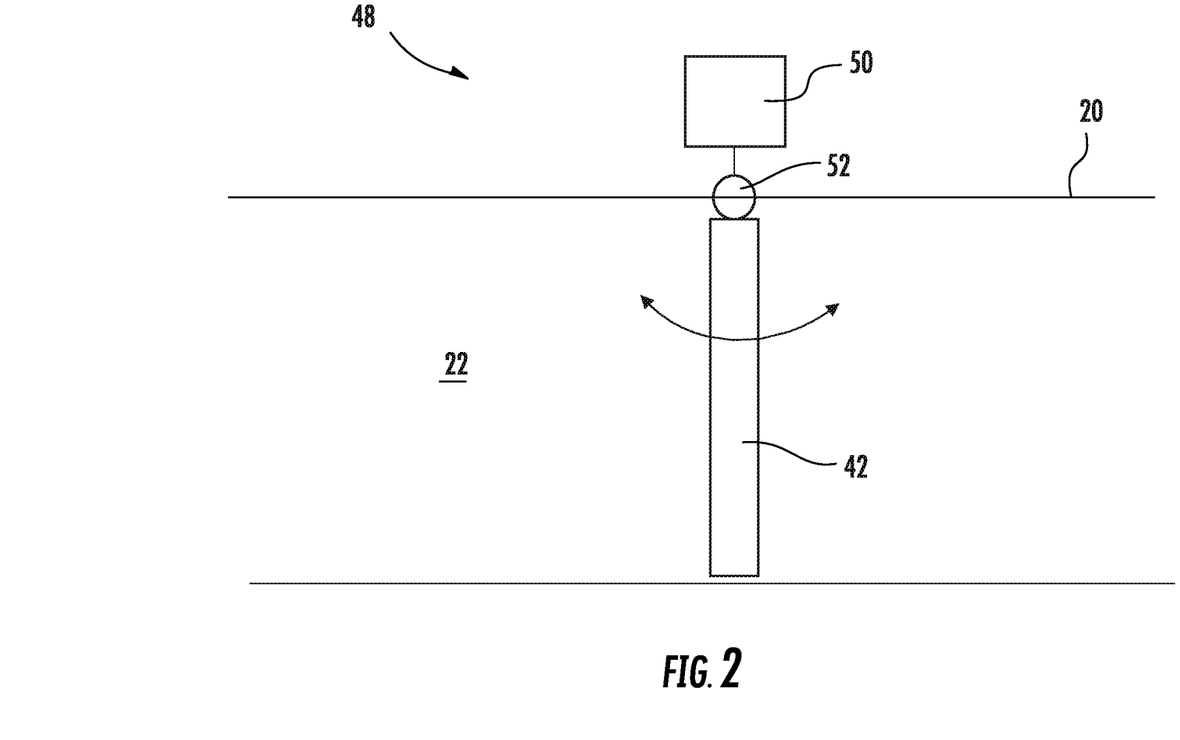
FIG. 2 is a schematic illustration of an embodiment of a filter deployment mechanism.

The filters are movable into and out of the air flowpath 22 of the air handler 20. The movement of the filters will be described below in the context of a particulate filter 42, but one skilled in the art will readily appreciate that such deployment mechanisms may be similarly utilized with a VOC filter 44 and a $CO_2$ scrubber 46. Referring to FIG. 2, a filter deployment mechanism 48 is utilized to move the particulate filter 42 into and/or out of the air flowpath 22. The particulate filter 42 is connected to an actuator 50 via a pivot 52. When the actuator 50 is activated, the actuator 50 rotates the particulate filter 42 about the pivot 42 between a deployed position where the filter 42 is substantially perpendicular to the direction of airflow through the air flowpath 22, and a stowed position where the filter 42 is substantially parallel to the direction of airflow through the air flowpath 22. In the embodiment of FIG. 2, the pivot 52 is located at one end of the filter 42, while in other embodiments the pivot may be at other location of the filter 42, such as a center of the filter 42.

Figure 3:
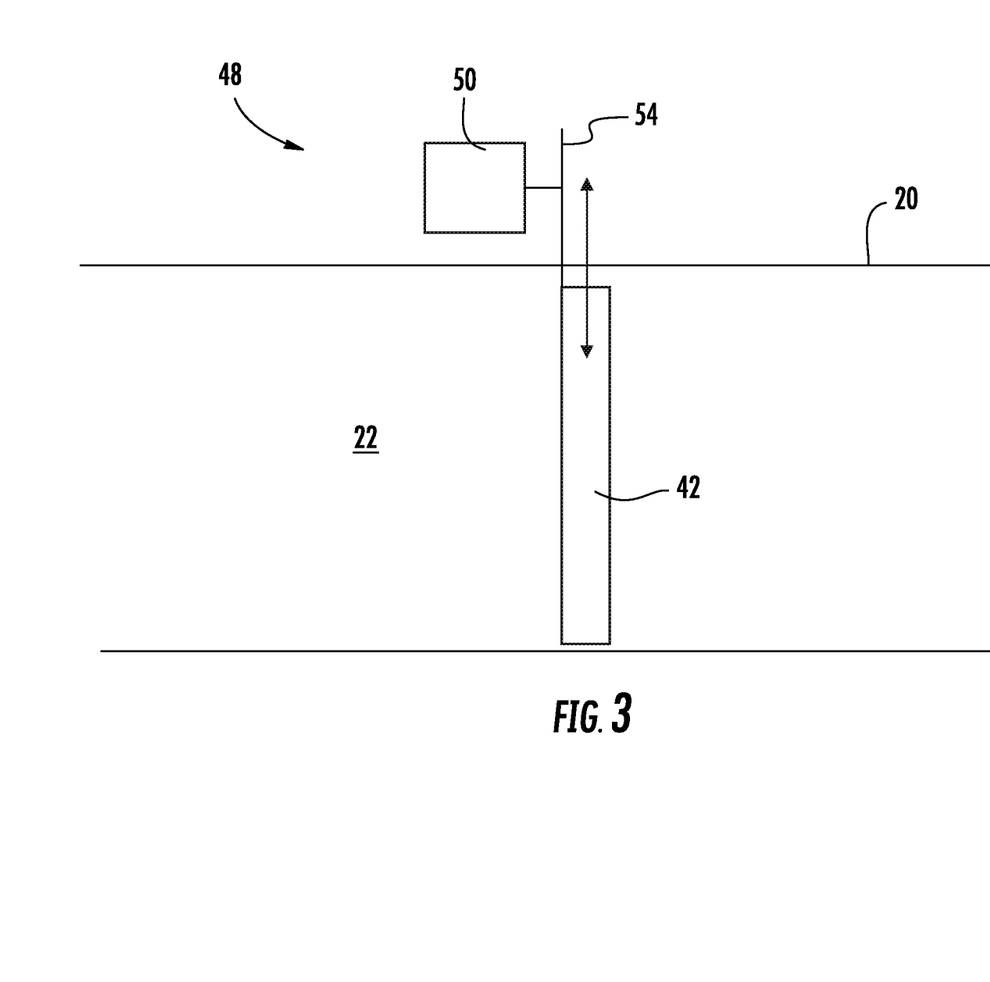
FIG. 3 is a schematic illustration of an embodiment of a filter deployment mechanism.

In an embodiment, shown in FIG. 3, the actuator 50 is connected to the filter 42 via a linkage 54. When the actuator 50 is activated, the filter 42 is moved laterally between the deployed position substantially across the air flowpath 22 and a stowed position substantially outside of the air flowpath 22. In an embodiment, the filter is moved from a deployed position substantially across the air flowpath 22 and a stowed position substantially outside of the air flowpath 22 by rotation about a hinge wherein the filter 42 is disposed substantially flat against a duct wall in the stowed position. In any embodiment the actuator 50 can be connected to the filter 42 directly, or to a linkage member, for transferring and/or translating motion imparted by actuation of the actuator 50 to the filter 42.

Referring again to FIG. 1, the HVAC system 10 includes a control system 56 connected to the fans 32, 34, the dampers 36, 38, 40, and the coil valves 28, 30. Further, the control system 56 is operably connected to the filters 42, 44, 46, in particular to the filter deployment mechanism 48 connected to each of the filters. The control system 56 controls the various components of the HVAC system 10 to provide conditioned supply airflow 12 to the conditioned space 14 at a selected temperature, while maintaining a selected IAQ in the conditioned space 14. Further, it is desired to minimize energy consumption of the HVAC system 10.

The HVAC system 10 further includes a plurality of sensors operably connected to the control system 56 to provide data to the control system 56 such that the control system 56 can determine filter positions, damper positions, fan operation, valve position, and the like by utilizing the sensor data. A supply temperature sensor 58 and a supply pressure sensor 60 are located at the supply airflow damper 36. The sensors at the supply airflow damper 36 detect the condition of the supply airflow 12 entering the conditioned space 14 to ensure the selected set point temperature is achieved in the conditioned space 14.

Further, a plurality of return air sensors are located in the air handler 20 upstream of the return air flow damper 38. Such sensors detect the conditions of the return airflow 16 approaching the return airflow damper 38. The sensors located upstream of the return airflow damper 38 include a return temperature sensor 62, a return humidity sensor 64, a return $CO_2$ sensor 66, a return particulate sensor 68 and a return VOC sensor 70.

Additionally, a plurality of outside air sensors are located upstream of the outside airflow damper 40, including an outside temperature sensor 72, an outside humidity sensor 74 and an outside particulate sensor 76. The outside air sensors monitor conditions of the outside airflow 18 prior to the outside airflow 18 being admitted into the air handler 20 via the outside airflow damper 40. Additionally, the air handler 20 may include other sensors, such as a mixing chamber temperature sensor 80 located in a mixing chamber 82 of the air handler 20, which is downstream of both the return airflow damper 38 and the outside airflow damper 40, and upstream of the filters.

Additional dampers may be utilized in the air handler 20, such as an exhaust air damper 84 to exhaust return airflow 16 to ambient without the return airflow 16 proceeding across the filters. In effect, if the exhaust air damper 84 is opened and the return airflow damper 38 is closed, the return airflow 16 bypasses the filters and coils of the air handler 20 and is merely exhausted to ambient, not returned to the conditioned space 14. Further, the air handler 20 may include a purge damper 86 downstream of the coils, but upstream of the supply airflow damper 36. The purge damper 86 may be opened to, for example, purge excess $CO_2$ from the air handler 20.

Figure 4:
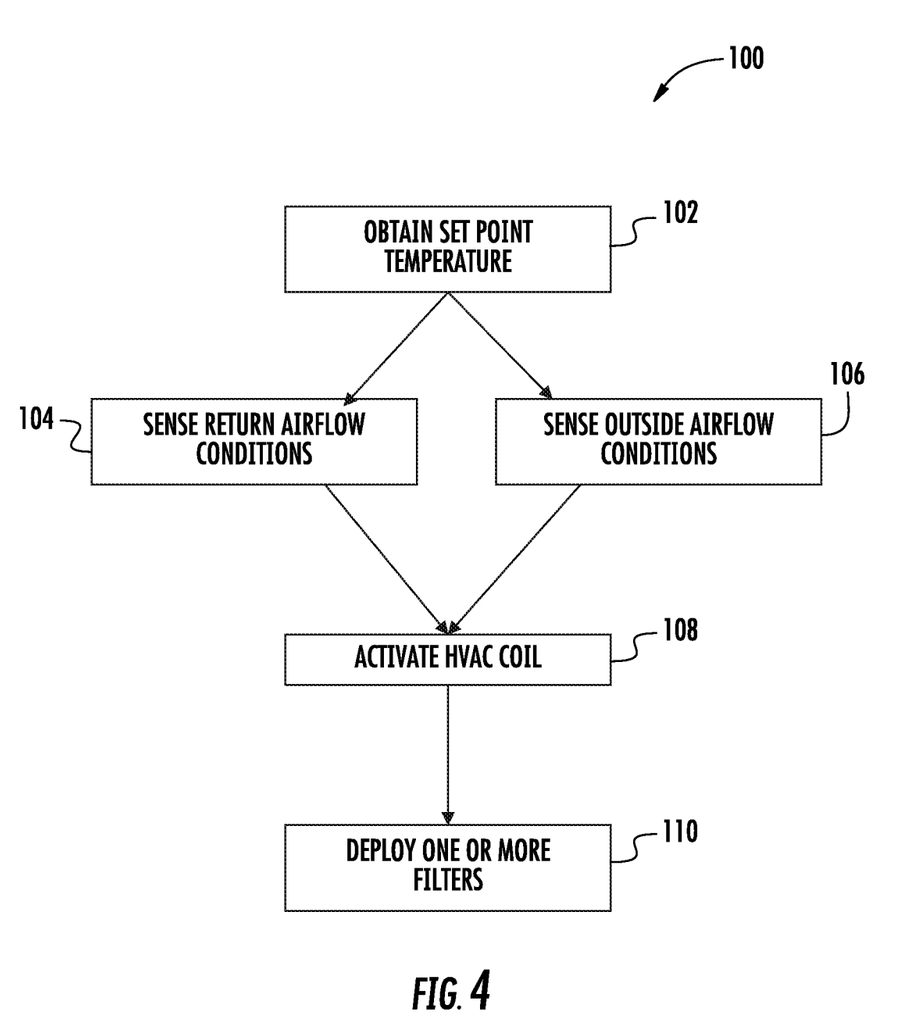
FIG. 4 illustrates a method of operation of an HVAC system.

Referring now to FIG. 4, a method 100 of operating the HVAC system 10 is illustrated. The method includes receiving a set point temperature at block 102. Conditions of the return airflow 16 are sensed at block 104. The conditions include return air temperature, return air humidity, return air $CO_2$ level, return air particulate matter level, and return air VOC level. At block 106, conditions of the outside airflow 18 are sensed, including outside airflow temperature, outside air humidity, and outside air particulate matter level. At block 108, based on the sensed outside airflow temperature, return air temperature and the set point temperature, the cooling coil 24 or the heating coil 26 is activated. Further, at block 110, the controller selectably deploys one or more of the filters 42, 44, 46 and/or selects one or more of the return airflow 16 or outside airflow 18 to be admitted into the air handler 20.

The decision is based on whether the return airflow 16 or the outside airflow 18 is sensed to exceed a threshold for one or more of the indoor air quality measures of $CO_2$ level, VOC level, or particulate matter level. Further, the control system 56 takes into account energy required to bring the source air (either return airflow 16 or outside airflow 18) to the temperature required to meet the set point temperature. If the energy required to condition the source airflow by heating or cooling exceeds the excess energy used when the filter is deployed (such as fan operation requirements, etc.) the control system 56 may signal to deploy the one or more filters 42, 44, 46. On the other hand, if the source airflow can be selected such that the supply airflow 14 meets the indoor air quality measures and the additional energy required to condition the source airflow does not exceed the additional energy required due to filter deployment, the filters will not be deployed, and the source airflow will be appropriately selected.

Figure 5:
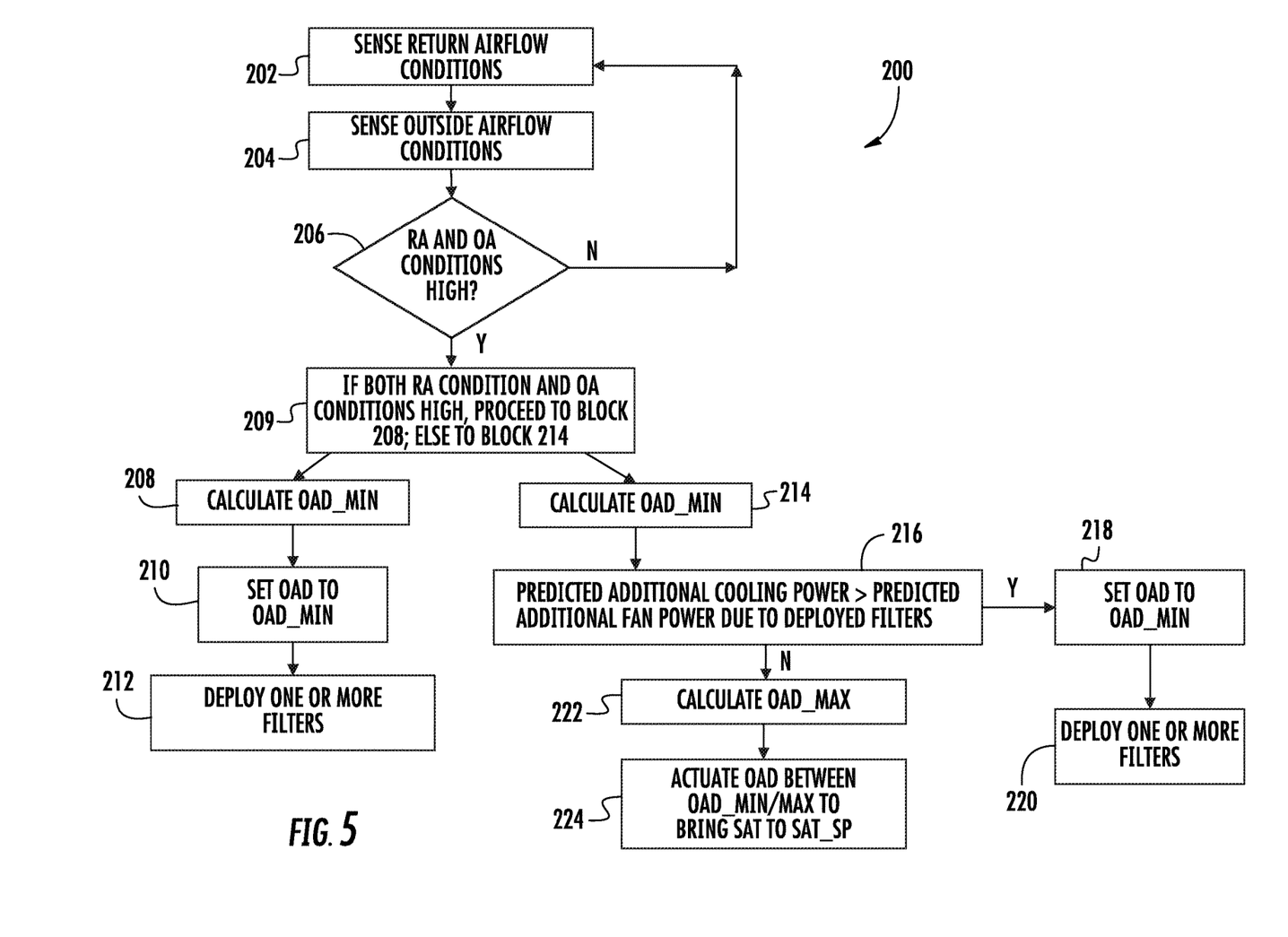
FIG. 5 illustrates another method of operation of an HVAC system.

An embodiment of a method 200 is illustrated in FIG. 5. In the method of FIG. 5, one or more return airflow conditions, such as $CO_2$, VOC or particulate matter concentration is sensed at block 202 and an outside airflow particulate matter concentration is sensed at block 204. The return airflow conditions are compared to selected thresholds and the outside airflow particulate matter concentration is compared to a selected threshold at block 206. If the return airflow conditions are below threshold, the method returns to block 202. As shown in block 209, if one or more of the return airflow conditions exceeds the selected threshold, and the outside airflow particulate matter concentration exceeds its threshold, the method proceeds to block 208, where the minimum outside air damper setting is calculated, based on, for example, system load and ventilation requirements. The outside air damper is set to the calculated minimum outside air damper setting at block 210. One or more of the filters 42, 44, 46 are deployed at block 212.

If, on the other hand, the outside airflow particulate matter concentration is below the selected threshold at block 206, as shown in block 209 the method proceeds to block 214, where the minimum outside air damper setting is calculated, based on, for example, system load and ventilation requirements. At block 216, a predicted additional cooling power required to condition the outside airflow is compared to a predicted additional fan power required due to deployment of one or more filters. If the predicted cooling power required exceeds the predicted additional fan power required, the outside air damper is set to the minimum outside air damper setting at block 218, and one or more filters are deployed at block 220. If, on the other hand, the predicted cooling power required does not exceed the predicted additional fan power required, an outside air damper maximum setting is calculated at block 222. At block 224, the outside air damper is actuated between the calculated maximum and minimum settings to achieve the selected temperature set point.

The HVAC system 10 disclosed herein only deploys filters 42, 44, 46 when needed, thus can avoid additional energy consumption due to additional pressure drop which results from filter deployment across the flowpath 22. Deployment of filters only as needed also has the technical effect of extending filter service life. Such effects will be notable in geographic locations where indoor and outdoor air quality issues arise intermittently.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heating, ventilation, and air conditioning (HVAC) system, comprising:
   an air handling unit;
   a supply airflow damper to direct a supply airflow from the air handling unit to a conditioned space;
   one or more filters selectively deployable across a flowpath of the air handling unit to remove one or more contaminants from the supply airflow prior to the supply airflow passing through the supply airflow damper;
   a control system operably connected to the one or more filters to direct movement of the one or more filters between a deployed position and a stowed position;
   an outdoor airflow damper disposed at the air handling unit configured to selectably admit an outside airflow into the air handling unit; and
   one or more of a heating coil and a cooling coil disposed in the air handling unit to condition the supply airflow;
   wherein the one or more filters are disposed along the flowpath between the outdoor airflow damper and the one or more of the heating coil and the cooling coil; and
   a plurality of sensors disposed at the air handling unit and operably connected to the control system, the control system directing movement of the one or more filters based on conditions sensed by the plurality of sensors;
   wherein the plurality of sensors includes a plurality of outside airflow sensors disposed upstream of the outdoor airflow damper; and
   a purge damper disposed downstream of the one or more of a heating coil and a cooling coil and upstream of the supply airflow damper to selectably purge excess $CO_2$ from the air handler.

2. The HVAC system of claim 1, wherein the one or more filters include a particulate filter, a volatile organic compound filter, or a $CO_2$ scrubber.

3. The HVAC system of claim 1, further comprising a return airflow damper to direct a return airflow from the conditioned space into the air handling unit, wherein the plurality of sensors includes a plurality of return airflow sensors disposed at the return airflow damper.

4. The HVAC system of claim 3, wherein the plurality of return airflow sensors include one or more of a return particulate matter sensor, a return volatile organic compound sensor, and a return $CO_2$ sensor.

5. The HVAC system of claim 3, wherein the control system signals for deployment of one or more filters when a condition sensed by a return airflow sensor of the plurality of return airflow sensors exceeds a selected threshold.

6. The HVAC system of claim 3, wherein the return airflow damper is moved between an opened position and a closed position in response to a return airflow condition detected by the plurality of return airflow sensors.

7. The HVAC system of claim 1, wherein the plurality of outdoor airflow sensors includes an outdoor airflow particulate matter sensor.

8. The HVAC system of claim 1, wherein the control system signals for deployment of one or more filters when a condition sensed by an outside airflow sensor of the plurality of outside airflow sensors exceeds a selected threshold.

9. The HVAC system of claim 1, wherein the outdoor airflow damper is moved between a minimum opened position and a maximum opened position in response to an outdoor airflow condition detected by the plurality of outside airflow sensors.

10. The HVAC system of claim 1, wherein the one or more filters are configured to rotate about a pivot to move between a deployed position and a stowed position.

11. The HVAC system of claim 1, further comprising one or more fans disposed in the air handling unit to direct airflow through the air handling unit.

* * * * *